(12) United States Patent
Kim et al.

(10) Patent No.: US 7,914,190 B2
(45) Date of Patent: Mar. 29, 2011

(54) HEADLAMP FOR VEHICLE

(75) Inventors: Jong-Un Kim, Gyeongsan (KR); Young-Ho Son, Gyeongsan (KR)

(73) Assignees: SL Seobong, Cheonan (KR); SL Lighting, Daegu (KR)

( * ) Notice: Subject to any disclaimer, the term of this patent is extended or adjusted under 35 U.S.C. 154(b) by 150 days.

(21) Appl. No.: 12/276,471

(22) Filed: Nov. 24, 2008

(65) Prior Publication Data
US 2009/0154187 A1    Jun. 18, 2009

(30) Foreign Application Priority Data
Nov. 23, 2007    (KR) .................. 10-2007-0120348

(51) Int. Cl.
*B60Q 1/04*    (2006.01)

(52) U.S. Cl. ........................ 362/539; 362/538

(58) Field of Classification Search .................. 362/539, 362/321
See application file for complete search history.

(56) References Cited

U.S. PATENT DOCUMENTS

| | | | | |
|---|---|---|---|---|
| 5,339,226 A | * | 8/1994 | Ishikawa | 362/539 |
| 7,090,385 B2 | * | 8/2006 | Sugimoto | 362/539 |
| 7,201,505 B2 | * | 4/2007 | Sugimoto et al. | 362/539 |

* cited by examiner

*Primary Examiner* — Anabel M Ton
(74) *Attorney, Agent, or Firm* — Edwards Angell Palmer & Dodge LLP; Kongsik Kim

(57) ABSTRACT

A headlamp capable of preventing dazzling of an opposite driver is provided. The headlamp includes a projection lens, a reflector, a light source disposed at a first focal point of the reflector, and a light shade part positioned around a second focal point of the reflector. The light shade part includes a first shade comprising a plurality of shading plates for forming a desired light distribution pattern and a second shade formed as a continuous surface or discrete surfaces connected to the uppermost surfaces of the shading plates of the first shade.

4 Claims, 19 Drawing Sheets

HEADLAMP FOR VEHICLE

CROSS-REFERENCE TO RELATED APPLICATION

This application is based on and claims priority from Korean Patent Application No. 10-2007-0120348, filed on Nov. 23, 2007, the disclosure of which is incorporated herein in its entirety by reference.

BACKGROUND

1. Technical Field

The present invention relates to a headlamp for a vehicle, and more particularly to a headlamp for a vehicle which does not dazzle the driver of a vehicle coming in the opposite direction.

2. Related Art

In general, a vehicle includes a lighting device having an illumination function of allowing the driver of the vehicle to see objects in the front of the vehicle at night traveling and a notification function of notifying drivers of other vehicles or pedestrians of a traveling state of the vehicle. For example, a headlamp or a fog lamp is used for illumination, while an indicator lamp, a rear lamp, a brake lamp or a side marker is used for notification.

FIG. 1 is a view schematically illustrating a conventional projection type headlamp for a vehicle. As the projection type headlamp possesses a characteristic of focusing light on one point, it is advantageous over a clear type headlamp in terms of light distribution. Also, the projection type headlamp imparts a sporty appearance.

The light emitted from a light source 11 is reflected from a mirror surface 12 of a certain shape, for example, an oval, and then is focused on one point 16 in the front of the light source 11. The focused light is refracted by a refraction lens 15 provided in the front of the lamp, and then is radiated in a forward direction. Upwardly emitted light among the emitted light is reflected from the mirror surface 12 to progress in a downward direction, and downwardly emitted light is reflected from a mirror surface 13 to proceed in an upward direction.

The projection type headlamp 10, unlike the clear type headlamp, focuses the light reflected from the mirror surface 12 on one point 16. Consequently, the projection type headlamp 10 can form various light distribution patterns by slightly changing the shape of a shield 14 around the point 16.

A recent technology proposed an adaptive front lighting system that can change light distribution patterns according to driving conditions of a vehicle, for example, traveling speed, road surface and surrounding brightness.

The adaptive front lighting system includes a plurality of light shade parts for interrupting a portion of the light emitted from a light source to determine a light distribution pattern, thereby adaptively changing the light distribution pattern in accordance with driving conditions. That is, the light shade parts are disposed along a circumference of a cylindrical body, the respective light shade parts have respective light distribution patterns, and the cylindrical body is rotated to change the light distribution pattern.

The adaptive front lighting system, however, has a drawback. Specifically, no light shading may occur between the light shade parts during the rotation of the body, that is, the light shade part may be opened. As a result, the driver of a vehicle coming in the opposite direction can be dazzled, which may cause a traffic accident.

Japanese Utility Model Registration No. 2577071 discloses a technique to solve the-above described problem associated with the opening of light shade part, in which the whole structure with the light shade parts is moved up or down by a cam when the light distribution pattern is changed. However, this technique entails frequent vertical movement, which may deteriorate the durability, and requires additional components, which may increase manufacturing costs.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Headlamps for a vehicle are provided which can change the light distribution pattern without dazzling drivers of the opposite vehicles.

According to an aspect of the present invention, there is provided a headlamp for a vehicle, which includes a projection lens, a reflector, a light source disposed at a first focal point of the reflector, and a light shade part positioned around a second focal point of the reflector. The light shade part includes a first shade comprising a plurality of shading plates for forming a desired light distribution pattern and a second shade formed as a continuous surface or discrete surfaces connected to the uppermost surfaces of the shading plates of the first shade.

The aspects, features and advantages of the present invention are not restricted to the one set forth herein. The above and other aspects, features and advantages of the present invention will become more apparent to one of ordinary skill in the art to which the present invention pertains by referencing a detailed description of the present invention given below.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
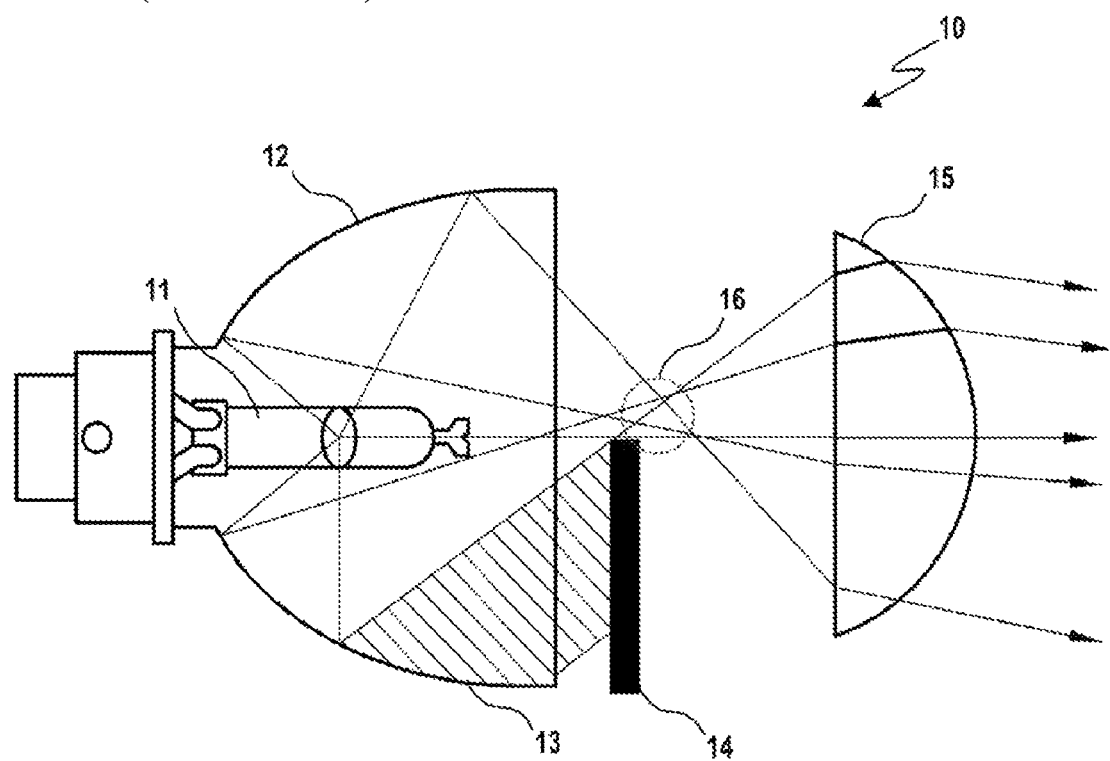
FIG. 1 is a cross-sectional view illustrating the construction of a conventional headlamp for a vehicle.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
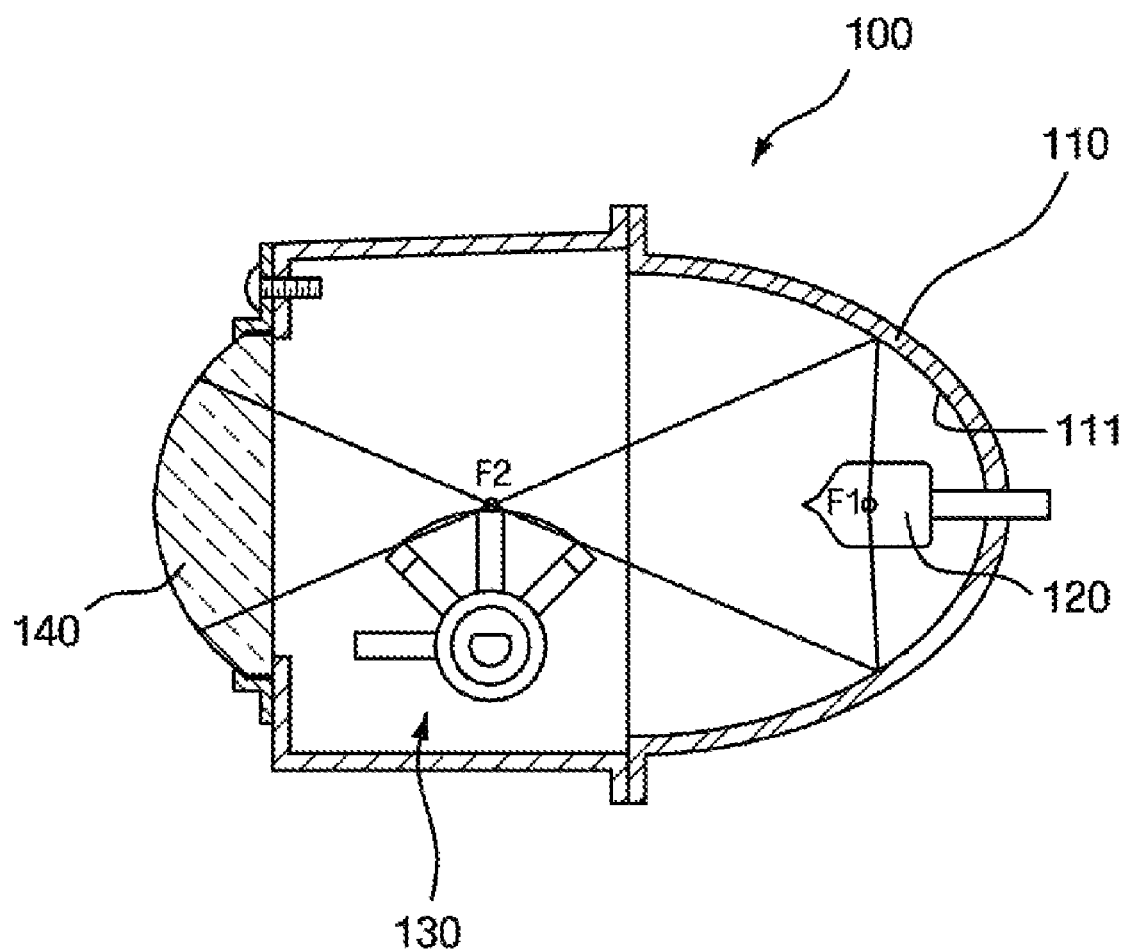
FIG. 2 is a cross-sectional view illustrating the construction of a headlamp for a vehicle according to an embodiment of the present invention.

FIG. 2 is a cross-sectional view illustrating the construction of a headlamp for a vehicle according to an embodiment of the present invention.

As shown in FIG. 2, a headlamp 100 for a vehicle according to an embodiment of the present invention includes an oval reflector 110, a light source 120 disposed at a first focal point F1 of the reflector 110, a light shade part 130 positioned around a second focal point F2 of the reflector 110 for adjusting a light distribution pattern of the light reflected from the reflector 110, and a projection lens 140 for projecting the light with the light distribution pattern adjusted by the light shade part 130.

A mirror surface 111 for reflecting the light emitted from the light source 120 is provided on an inside of the reflector 110. The light emitted from the light source 120 is reflected from the mirror surface 111 to reach the second focal point F2.

Figure 3:
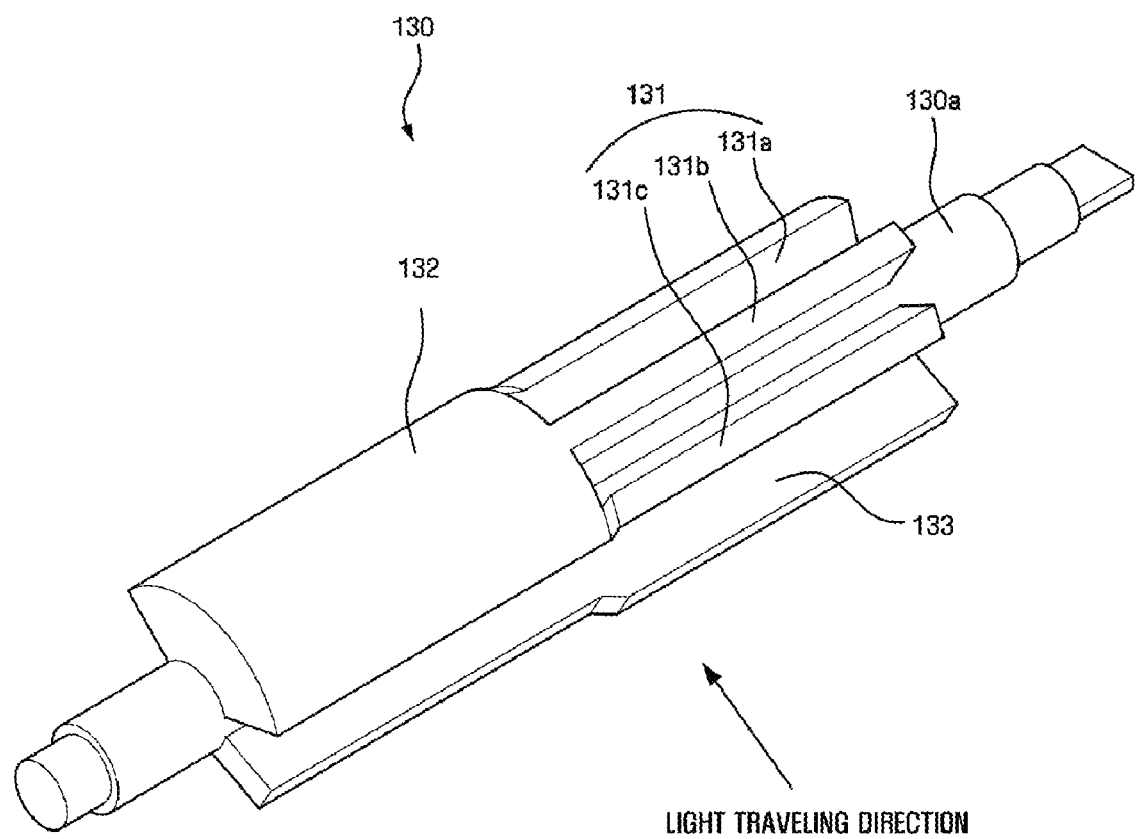
FIGS. 3 and 4 are perspective views illustrating a light shade part according to a first embodiment of the present invention.
Figure 4:
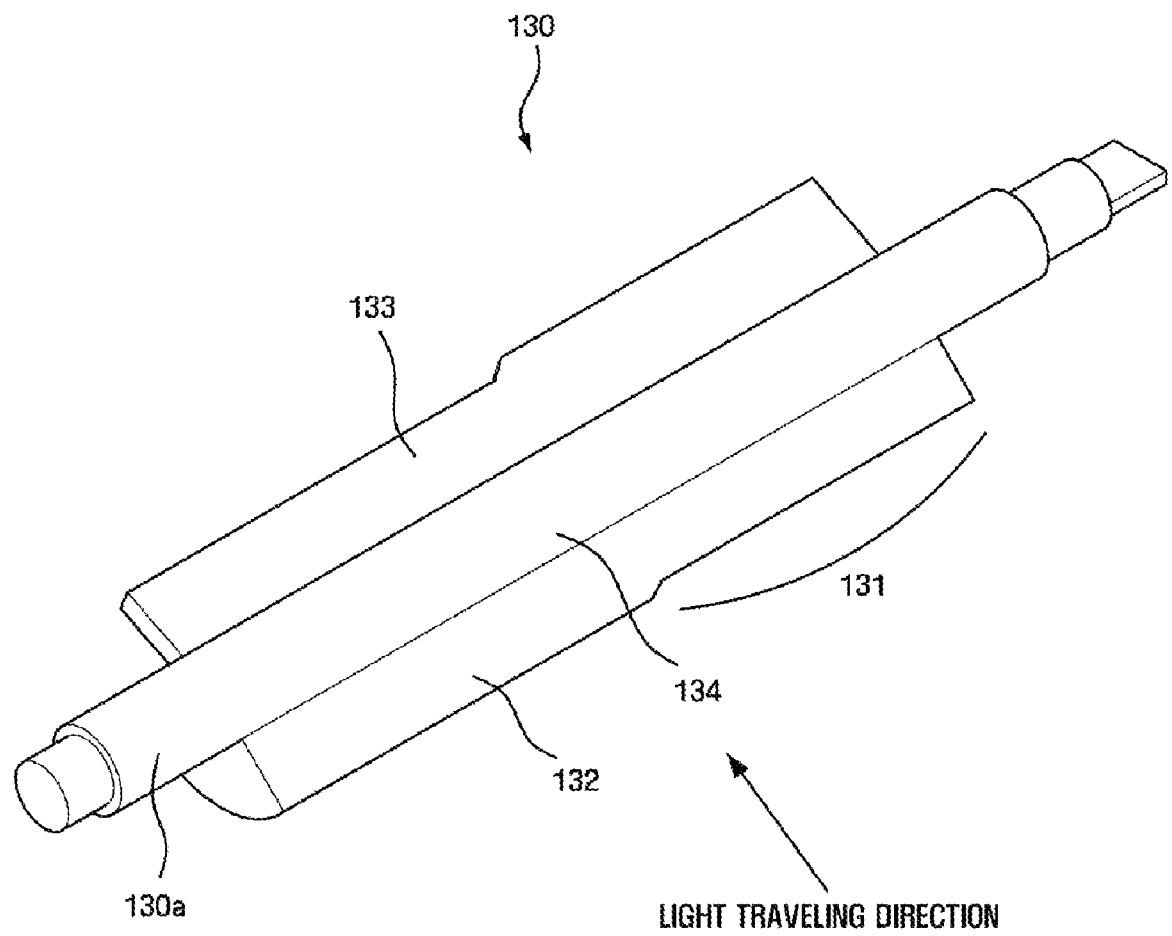
Figure 5:
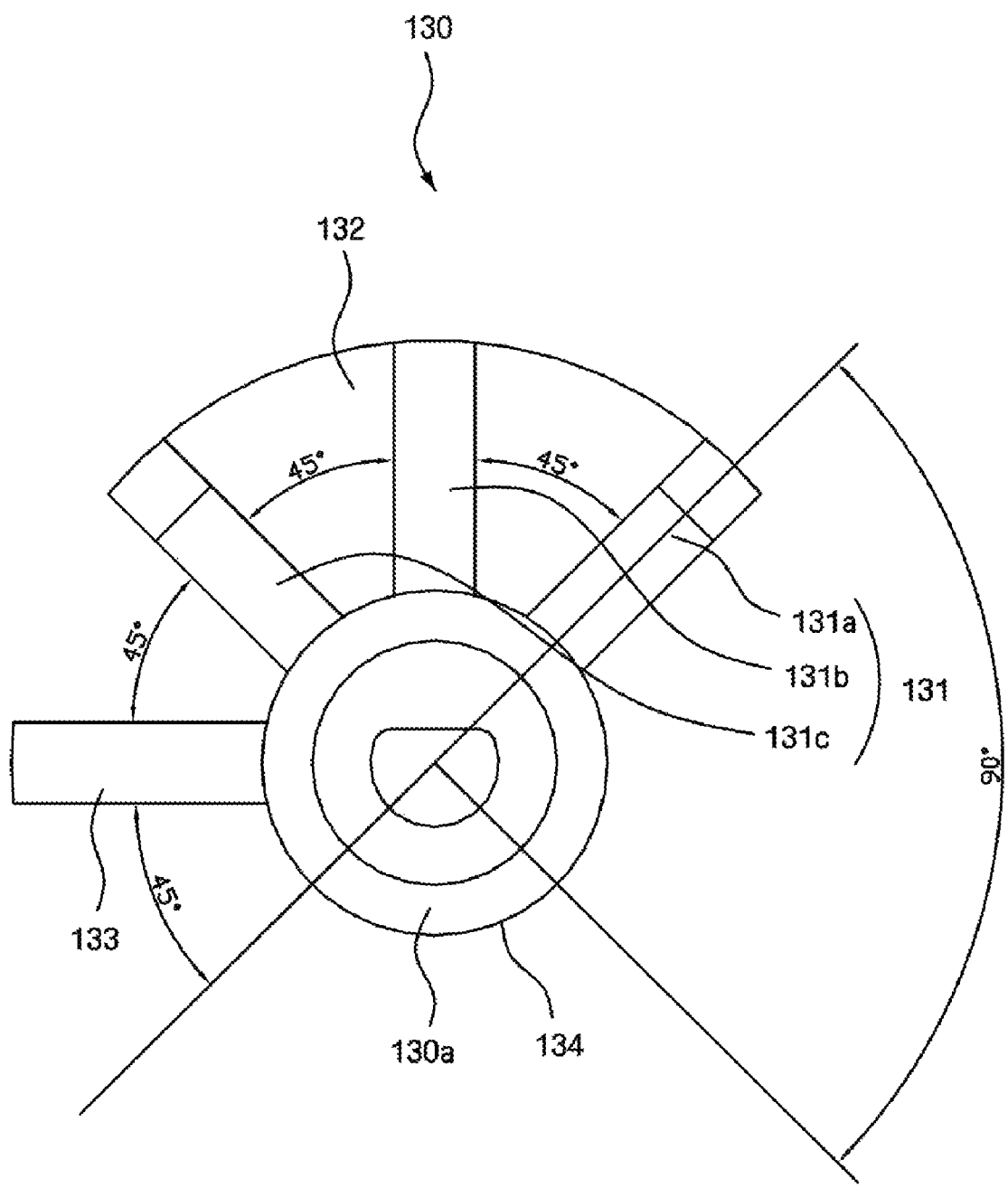
FIG. 5 is a side view illustrating the light shade part according to the first embodiment of the present invention.

FIGS. 3 and 4 are perspective views illustrating a light shade part 130 according to a first embodiment of the present invention, and FIG. 5 is a side view thereof.

As shown in FIGS. 3 to 5, the light shade part 130 according to the first embodiment of the present invention includes a first shade 131 for changing a light distribution pattern with respect to a traffic lane on which a vehicle travels, and a second shield 132 for changing a light distribution pattern with respect to an opposite traffic lane, that is, an opposite vehicle.

The first shade 131 may have a body and a plurality of shading plates disposed on the body. The body may have various cross-sectional shapes. For example, it may have a polygonal cross-section. Preferably, it may have a cylindrical cross-section. Also, it may have a portion of a polygonal cross-section and a portion of a cylindrical cross-section.

The first shade 131 according to the first embodiment, as shown in FIG. 3, includes a cylindrical body and a first shading plate 131a, a second shading plate 131b, and a third shading plate 131c which are protruding from the circumference of the cylindrical center portion 130a. The first, second, and third shading plates each have different light distribution patterns in accordance with a shape of the uppermost cross section thereof.

The shading plates 131a, 131b, and 131c interrupt the light reaching the second focal point F2 to form respective desired light distribution patterns with respect to a traffic lane of a vehicle.

Figure 6A:
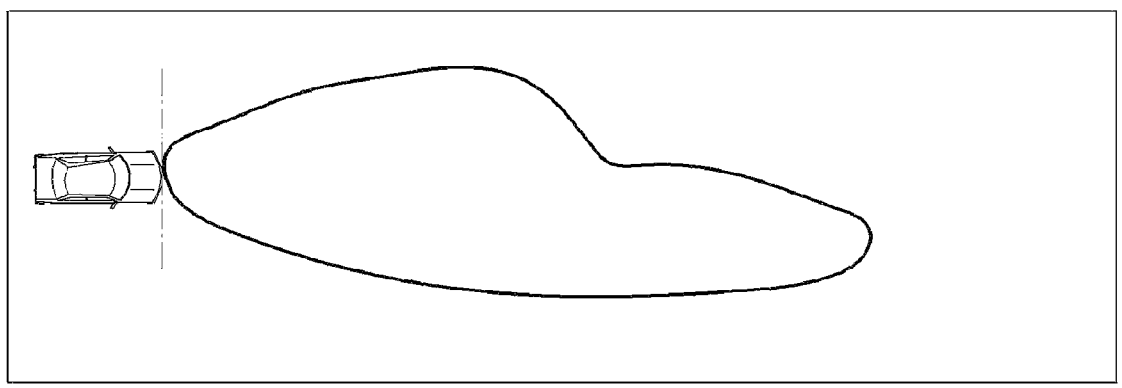
FIGS. 6A to 6F are views showing examples of various light distribution pattern of a vehicle.
Figure 6B:
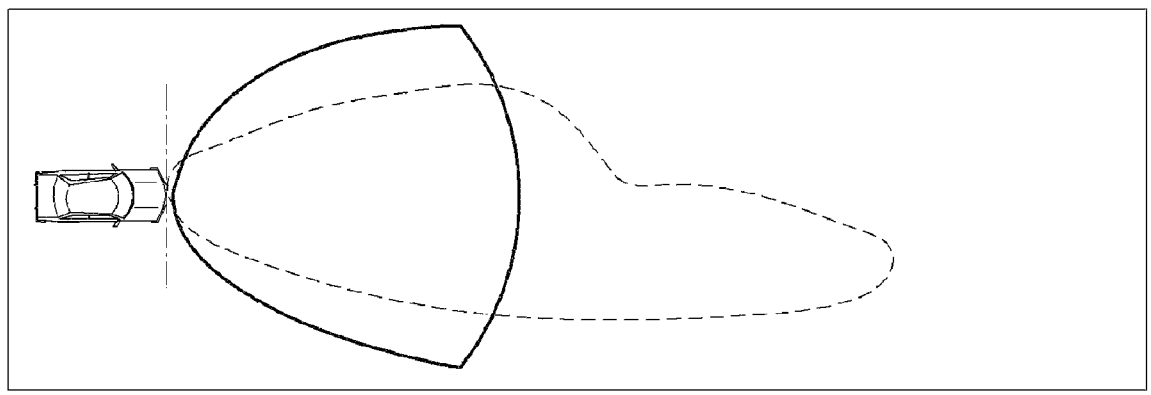
Figure 6C:
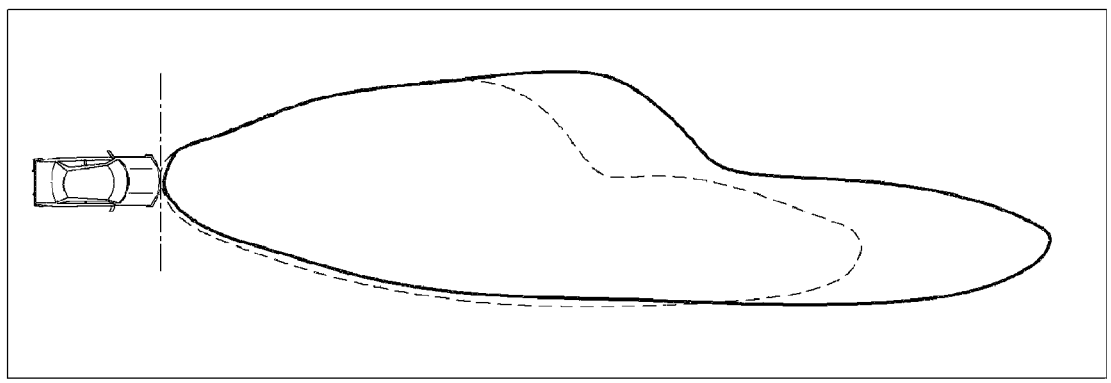
Figure 6D:
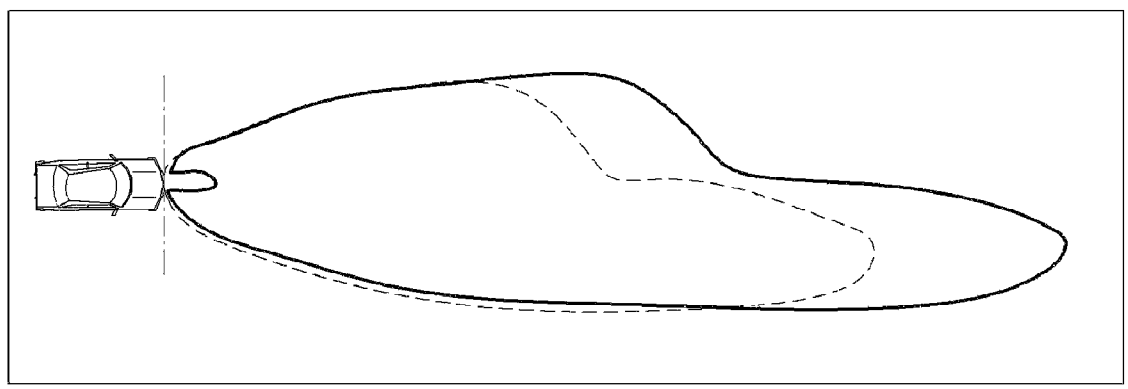
Figure 6E:
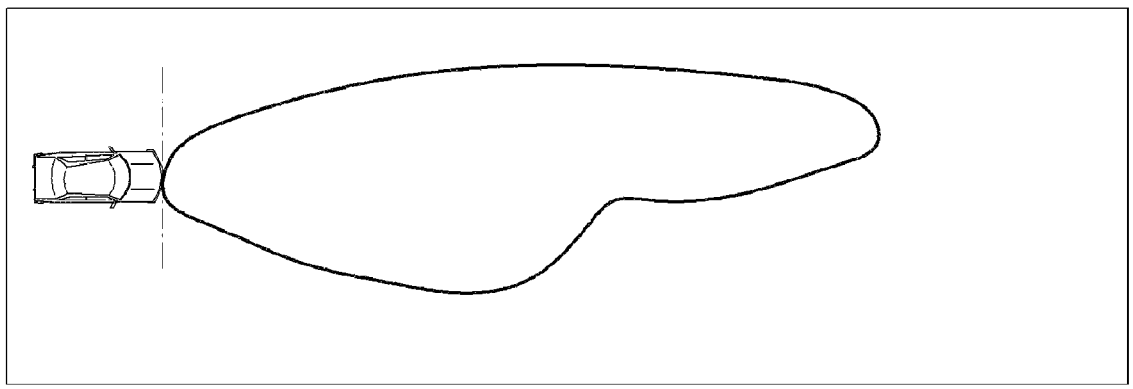
Figure 6F:
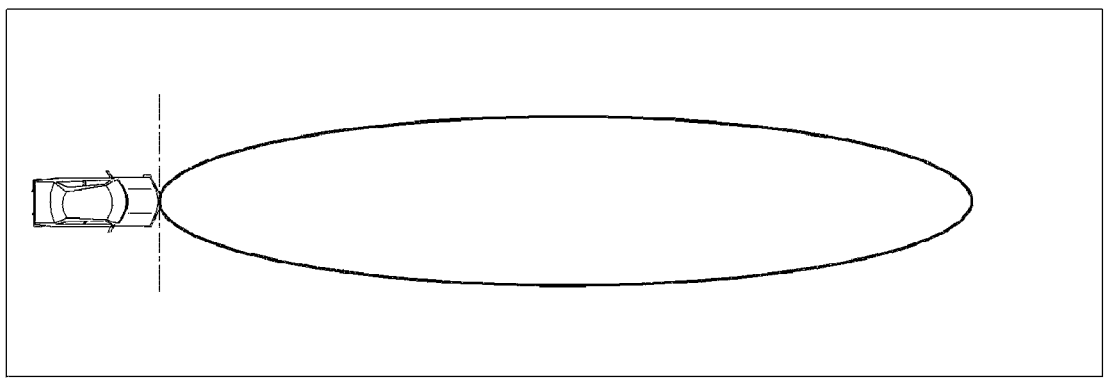

FIGS. 6A to 6F are views showing examples of various light distribution pattern of a vehicle. For example, the light distribution pattern of a vehicle is divided into a high beam as shown in FIGS. 6A to 6E and a low beam as shown in FIG. 6F, and will further be divided depending upon driving conditions, such as traveling speed, a road property, a road surface, a direction of traffic lane and the like.

FIGS. 6B to 6D, dot lines denote a light distribution pattern of Class C to compare the light distribution patterns. The conditions for forming the light distribution patterns are known in the art, and the detailed description thereof will be omitted herein.

The shading plates 131a, 131b, and 131c adjust a degree of interrupting the light reflected from the reflector 110 as the center portion 130a rotates around an axis, thereby forming the light distribution patterns as shown in FIGS. 6A to 6F. For illustration purposes, the first shade 131 which is set such that Class E as shown in FIG. 6C corresponds to the first shading plate 131a, Class V as shown in FIG. 6B corresponds to the second shading plate 131b and Class C as shown in FIG. 6A corresponds to the third shading plate 131c will be described herein.

The second shade 132 may be formed as a continuous surface or discrete surfaces connected to the uppermost surfaces of the shading plates of the first shade 131, which ensures that the light distribution pattern changed by the shading plates does not affect the driver of an opposite vehicle. For example, it may be formed as a surface connected to the uppermost surfaces of the shading plates 131a, 131b, and 131c of the first shade 131. In the case where the shading plates 131a, 131b, and 131c are rotated around the axis of the center portion 130a so as to change the light distribution pattern, the second shade 132 is to prevent the problem of dazzling of the driver of an opposite vehicle. Consequently, the light distribution pattern is smoothly changed with respect to the traffic lane of a vehicle by the first shade 131, and the dazzling problem is prevented by the second shade 132.

In a modified embodiment, the light shade part 130 may further include a third shade 133 for changing the light distribution pattern in regions or countries where vehicles are running in left lanes (i.e., for a right-hand drive vehicle) and a fourth shade 134 for a high beam. Here, for illustration purposes, the third shade 133 and the fourth shade 134 will be described with reference to RHD and High as shown in FIGS. 6E and 6F, respectively. The third shade 133 includes at least one shading plate having a pattern or patterns opposite to corresponding shading plate or shading plates of the first shade 131. The fourth pattern 134 includes the cylindrical center portion 130a with no additional shading plate for high beam.

Figure 7:
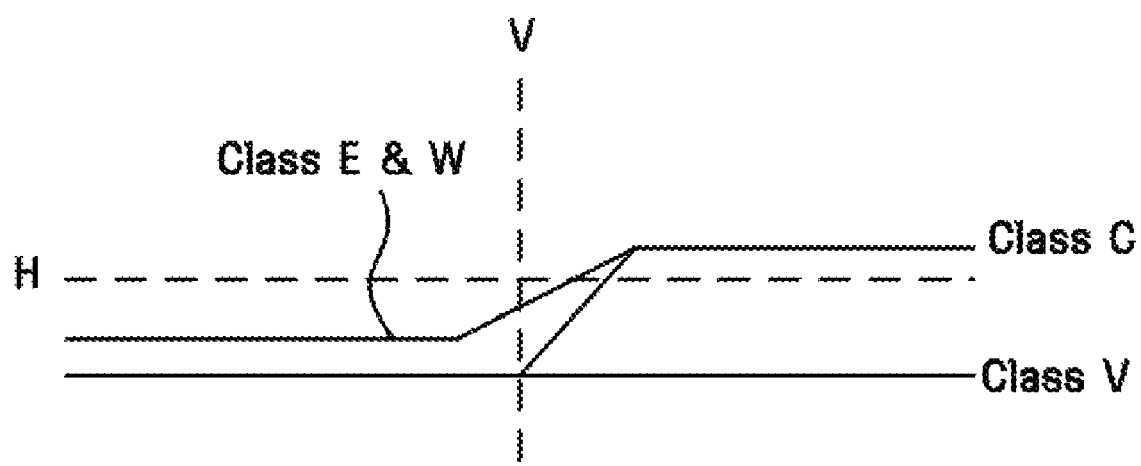
FIG. 7 is a graph showing a light distribution pattern according to an embodiment of the present invention.

FIG. 7 is a graph showing a light distribution pattern resulted by the first shade 131 and the second shade 132 to represent a boundary surface of an upper end of each irradiating beam with respect to an H-axis and a V-axis in accordance with the shape of the uppermost surfaces of the shading plates 131a, 131b, and 131c. In FIG. 7, the H-axis denotes a horizontal direction of a traffic lane, and a V-axis denotes a vertical direction of a traffic lane.

The state of the light shade part 130 according to the respective light distribution patterns in FIG. 7 will be described on the basis of the second focal point F2 in FIG. 2. In this instance, the state of the light shade part 130 will be described with reference of FIG. 6A to 6F.

FIGS. 8 to 12 are views schematically illustrating the states of the light shade part 130 in accordance with Class E, Class V, Class C, RHD and High.

Figure 8:
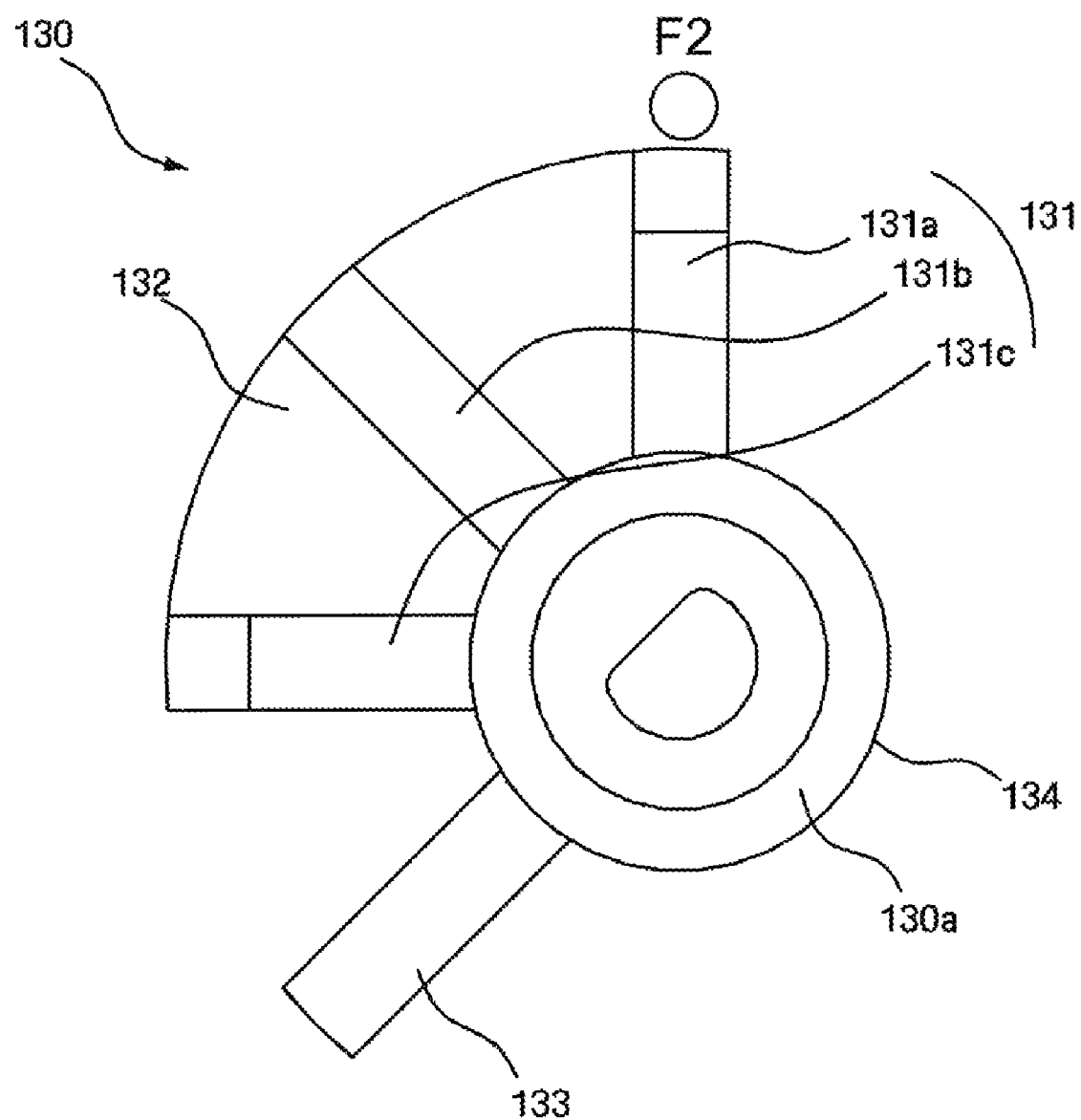
FIGS. 8 to 12 are views schematically illustrating the positions of the light shade part corresponding to the respective light distribution patterns according to an embodiment of the present invention.
Figure 9:
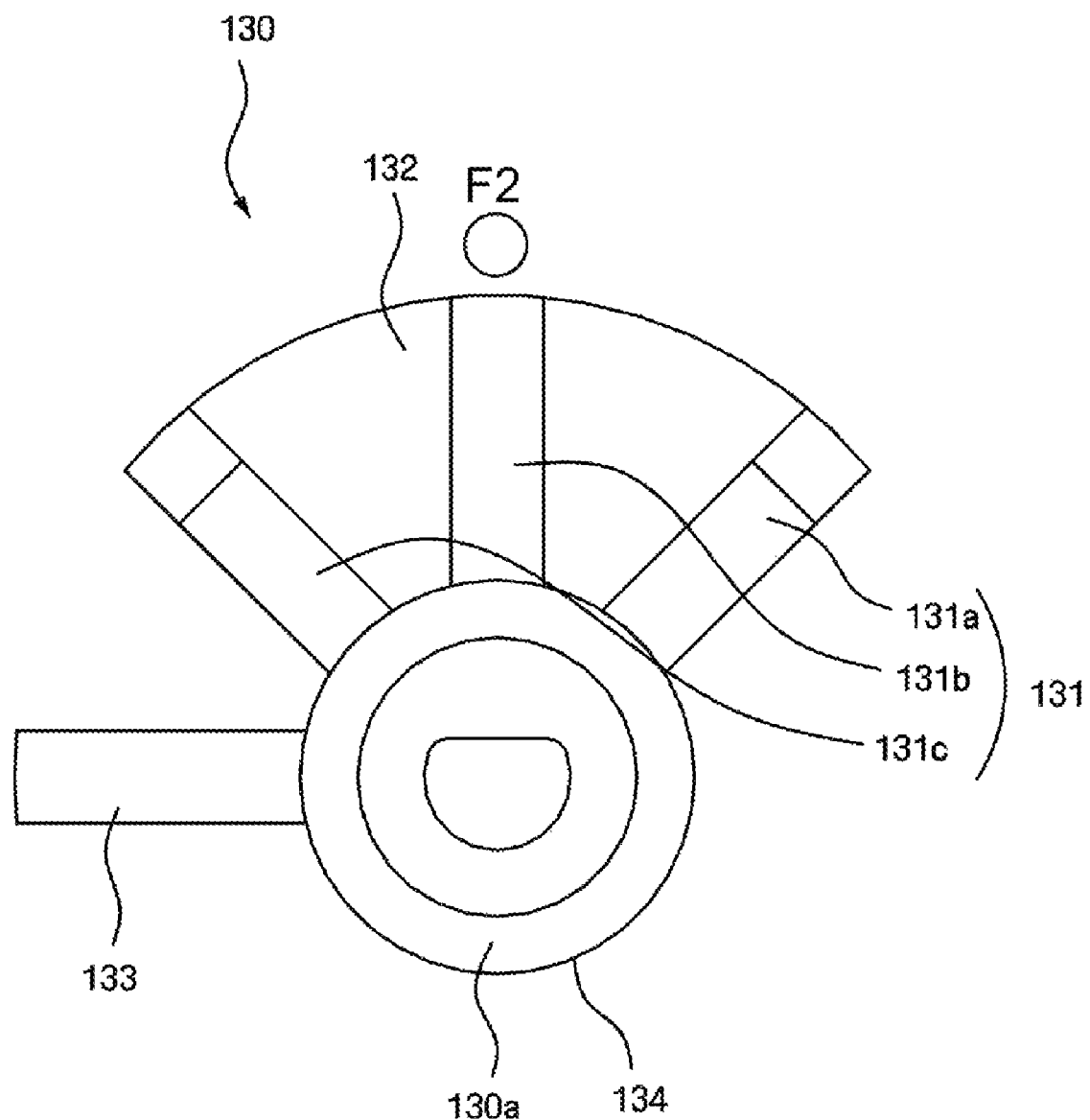
Figure 10:
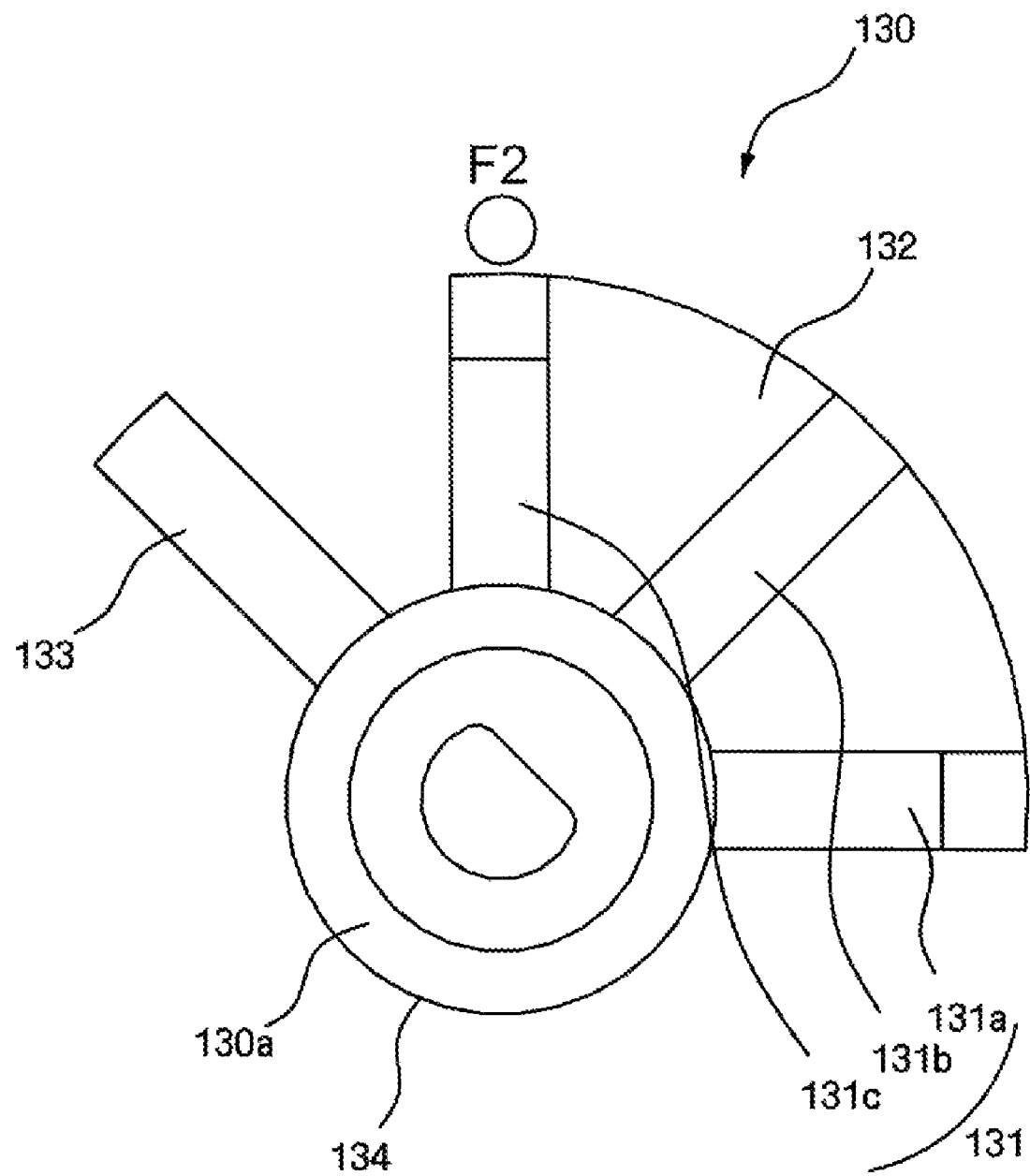
Figure 11:
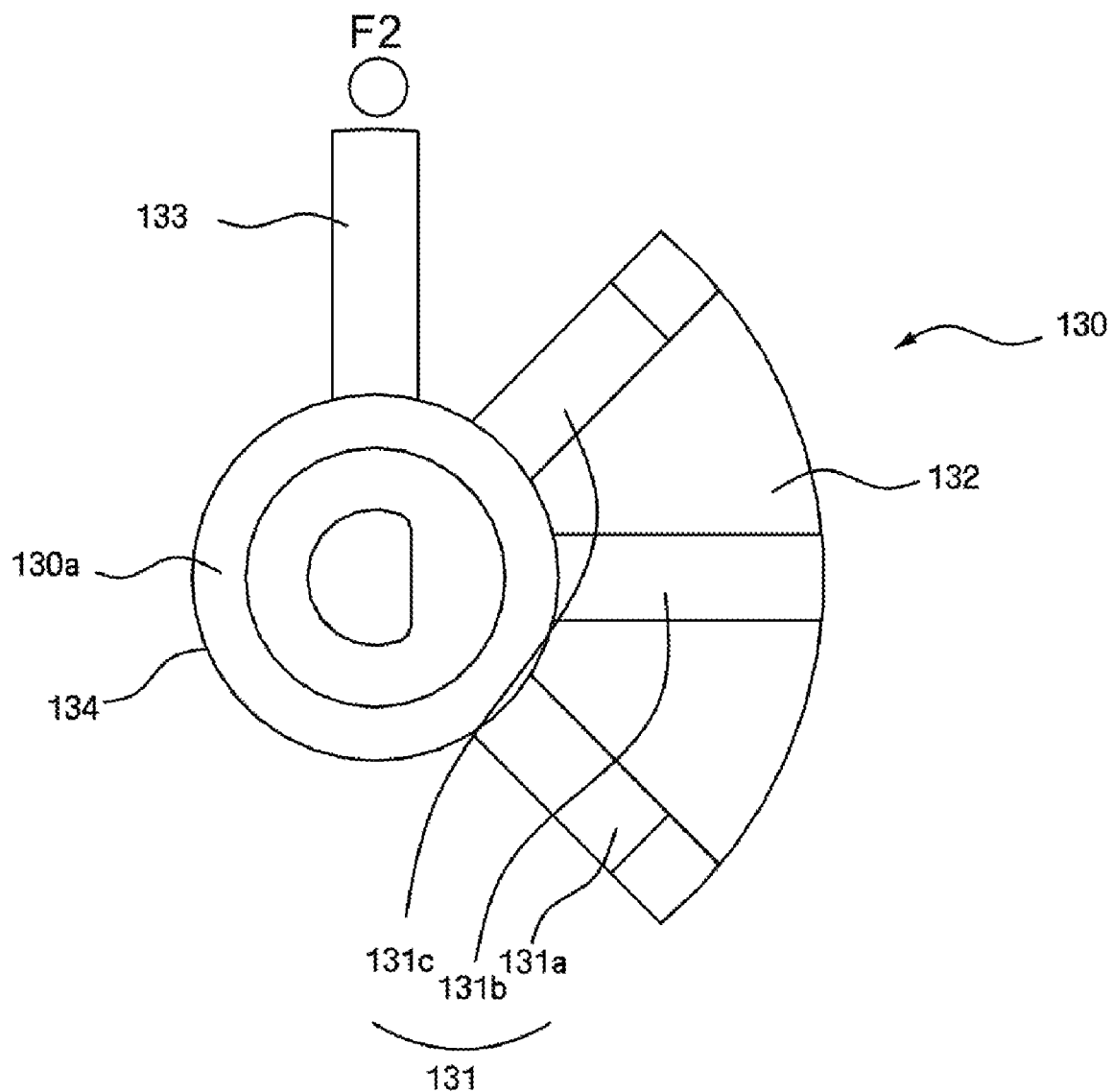
Figure 12:
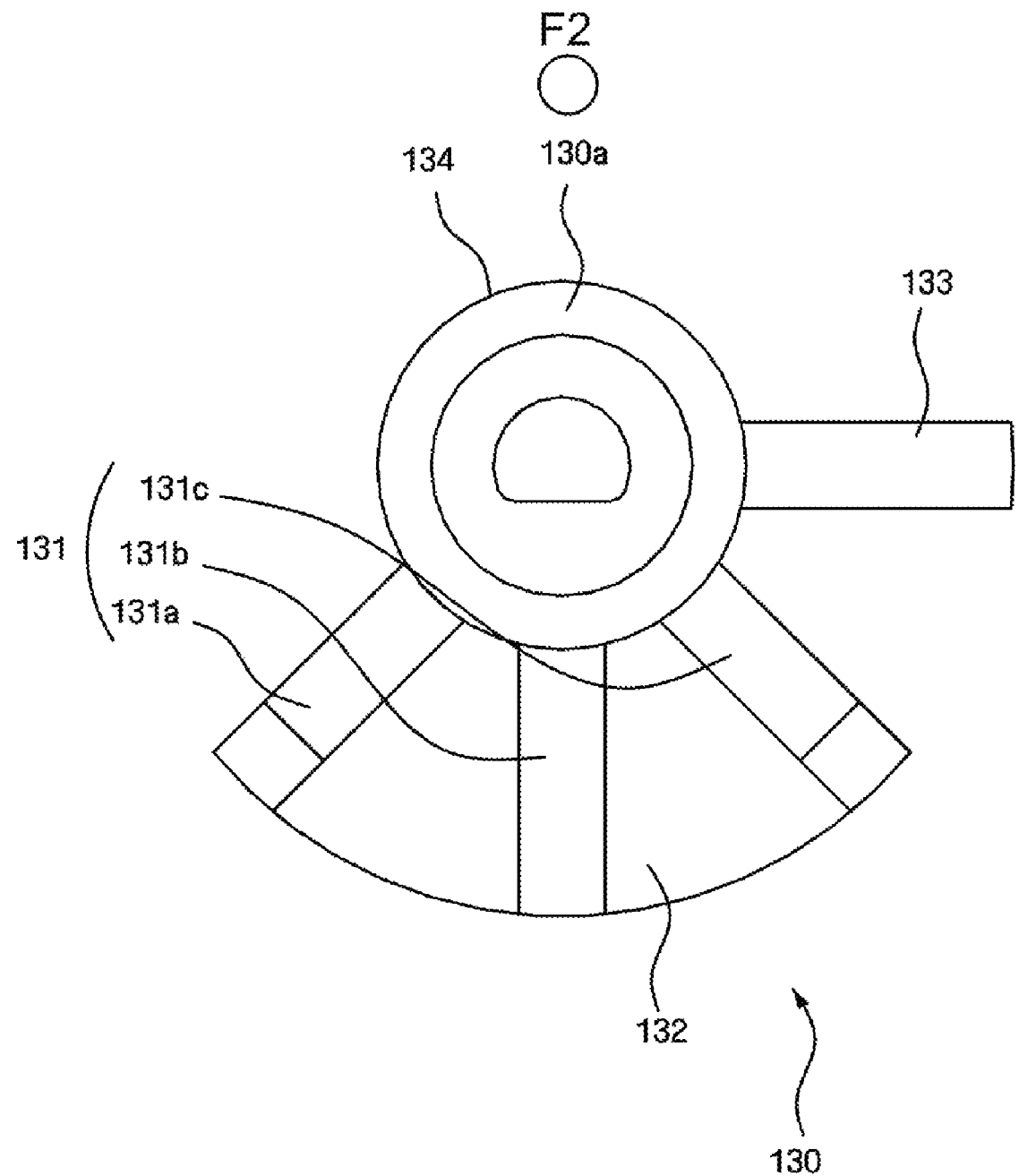

In FIG. 8, the light shade part 130 is rotated to place the first shading plate 131a at the second focal point F2, in order to form a light distribution pattern for Class E as shown in FIG. 6C. In FIG. 9, the light shade part 130 is rotated to place the second shading plate 131b at the second focal point F2, in order to form a light distribution pattern for Class V as shown in FIG. 6B. In FIG. 10, the light shade part 130 is rotated to place the third shading plate 131c at the second focal point F2, in order to form a light distribution pattern for Class C as shown in FIG. 6A. In FIG. 11, the third shade 133 is placed at the second focal point F2, in order to form a light distribution pattern for RHD as shown in FIG. 6E. In FIG. 12, the fourth shade 134 is placed at the second focal point F2, in order to form a light distribution pattern for High as shown in FIG. 6F. It is noted that the high beam is obtained since there is no additional shading plate in FIG. 12.

Although the first to third shading plates 131a to 131c and the third shade 133 are shown to have an angle of 45 degrees in FIG. 3, it is merely one example in order to help to understand the present invention. Therefore, it can be modified without such a limitation in accordance with driving conditions.

Figure 13:
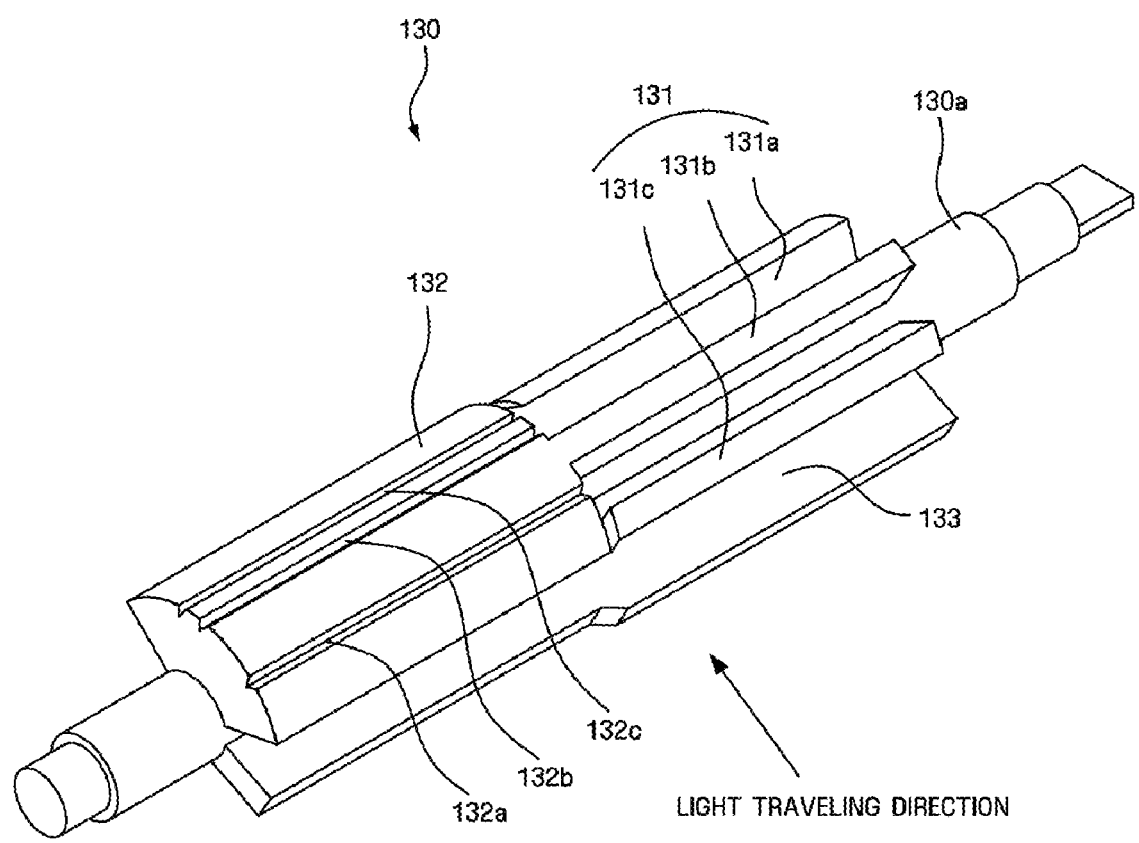
FIG. 13 is a perspective view illustrating a light shade part according to a second embodiment of the present invention.
Figure 14:
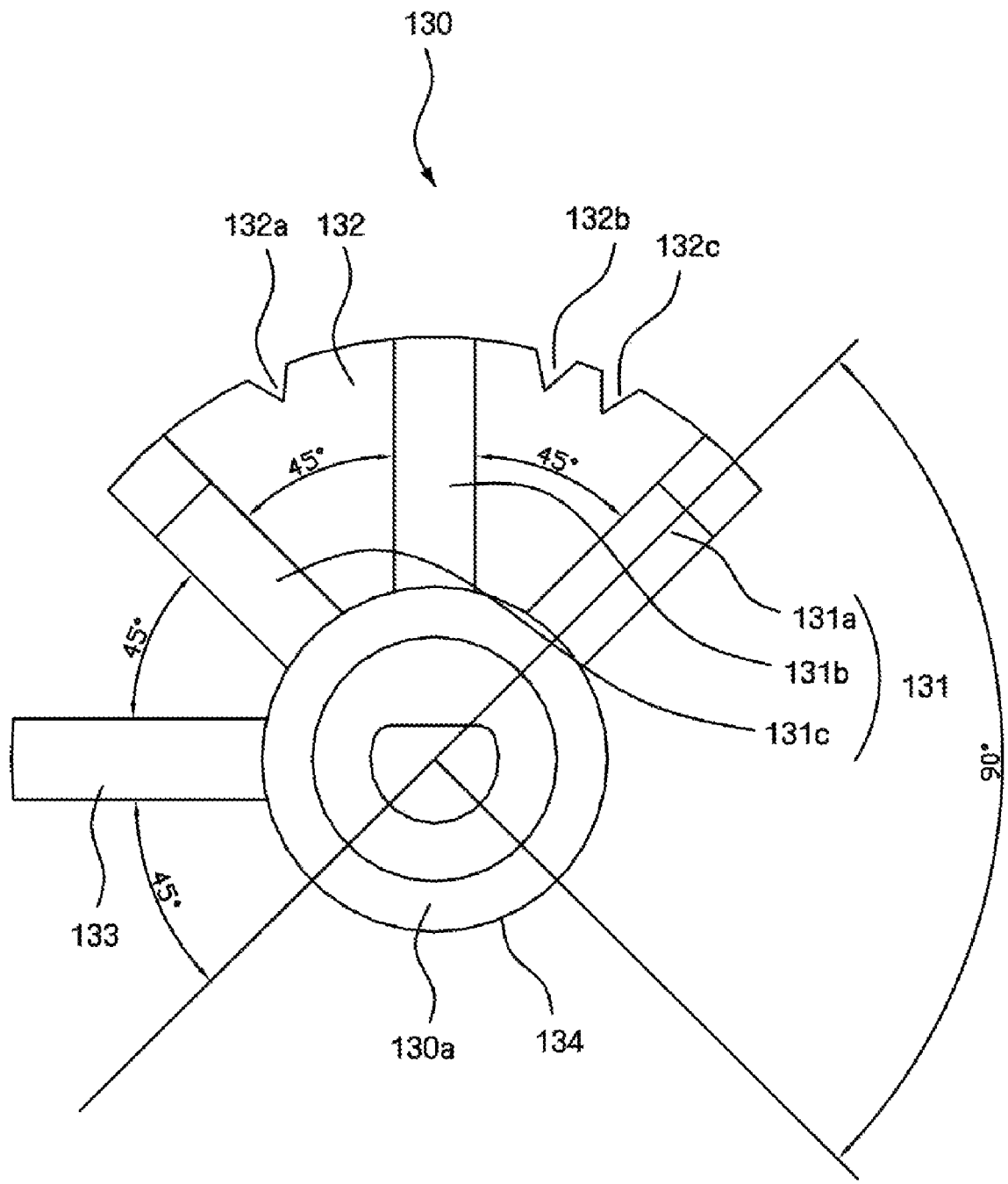
FIG. 14 is a side view illustrating the light shade part according to the second embodiment of the present invention.

FIG. 13 is a perspective view illustrating a light shade part 130 according to a second embodiment of the present invention, and FIG. 14 is a side view thereof.

The shade part 130 according to the second embodiment may include a plurality of grooves provided on the second shade. For example, as shown in FIG. 13, the light shade part 130 includes grooves 132a, 132b and 132c provided on the second shade 132 formed as a surface connected to the uppermost surfaces of the shading plates 131a, 131b and 131c. The light traveled from the light source can be reflected by the surface connected to the uppermost surfaces of the shading plates 131a, 131b and 131c to reach unwanted area or point. The grooves 132a, 132b and 132c provided on the surface may scatter the light so that the unwanted reflection can be prevented or reduced.

According to the embodiments of the present invention, the plurality of shading plates 131a, 131b and 131c protrude axially from the center portion 130a in order to change the light distribution pattern in accordance with the traffic lane of a vehicle, and the portion of the shading plates 131a, 131b and 131c corresponding to the opposite traffic lane is formed as a surface. Consequently, the light distribution pattern for the traffic lane of the vehicle can be changed without dazzling of an opposite driver. According to the embodiments, the durability of the headlamp can be improved and manufacturing costs can be reduced compared with the prior art headlamp.

Although preferred embodiments of the present invention have been described for illustrative purposes, those skilled in the art will appreciate that various modifications, additions and substitutions are possible, without departing from the scope and spirit of the invention as disclosed in the accompanying claims. For instance, although it is described that the first shade 131 and the second shade 132 are formed in a single body, they can be formed separately.

What is claimed is:

1. A headlamp for a vehicle comprising:
    a projection lens;
    a reflector;
    a light source disposed at a first focal point F1 of the reflector; and
    a light shade part positioned around a second focal point F2 of the reflector and including a first shade which comprises a plurality of shading plates for forming a desired light distribution pattern and a second shade which is formed as a continuous surface or discrete surfaces connected to the uppermost surfaces of the shading plates of the first shade,
    wherein the light shade part further includes a third shade having a cylindrical center portion with no shading plate for illumination of a high beam.

2. The headlamp of claim 1, wherein each of the shading plates of the first shade interrupts a part of light reflected from the reflector in order to form Class C, Class V or Class E.

3. The headlamp of claim 1, wherein the continuous surface or discrete surfaces are provided with a plurality of grooves.

4. The headlamp of claim 1, wherein the light shade part further includes a fourth shade, at least one shading plate having a pattern or patterns opposite to corresponding shading plate or shading plates of the first shade for a right-hand drive vehicle.

* * * * *